(12) United States Patent
McAnally et al.

(10) Patent No.: US 8,364,426 B2
(45) Date of Patent: Jan. 29, 2013

(54) FLOW DEVICE AND METHOD FOR OPERATING A FLOW DEVICE

(75) Inventors: Craig B. McAnally, Thornton, CO (US); Richard L. Maginnis, Lafayette, CO (US); Paul J. Hays, Lafayette, CO (US)

(73) Assignee: Micro Motion, Inc., Boulder, CO (US)

( * ) Notice: Subject to any disclaimer, the term of this patent is extended or adjusted under 35 U.S.C. 154(b) by 308 days.

(21) Appl. No.: 12/680,631

(22) PCT Filed: Oct. 8, 2007

(86) PCT No.: PCT/US2007/080722
§ 371 (c)(1),
(2), (4) Date: Jul. 13, 2010

(87) PCT Pub. No.: WO2009/048457
PCT Pub. Date: Apr. 16, 2009

(65) Prior Publication Data
US 2010/0275703 A1  Nov. 4, 2010

(51) Int. Cl.
*G01F 1/00* (2006.01)
*G06F 19/00* (2011.01)

(52) U.S. Cl. ..................... 702/45; 73/861.357

(58) Field of Classification Search ............ 702/45, 702/56, 72, 75, 104, 106, 151, 189; 73/861.12, 73/861.17, 861.357
See application file for complete search history.

(56) References Cited

U.S. PATENT DOCUMENTS

| | | |
|---|---|---|
| 5,426,984 A | 6/1995 | Rovner et al. |
| 5,576,500 A * | 11/1996 | Cage et al. ............... 73/861.357 |
| 5,831,178 A | 11/1998 | Yoshimura et al. |
| 6,520,028 B1 | 2/2003 | Van Cleve et al. |
| 2003/0051557 A1 | 3/2003 | Ishikawa et al. |
| 2007/0255534 A1 | 11/2007 | Keese et al. |

FOREIGN PATENT DOCUMENTS

| | | |
|---|---|---|
| EP | 1306659 A2 | 10/2002 |
| FR | 2911680 A1 | 7/2008 |
| GB | 2099148 A | 12/1982 |

(Continued)

OTHER PUBLICATIONS

Peter Enokssonet et al., "A Silicon Resonant Sensor Structure for Coriolis Mass-Flow Measurements", Journal of Microelectromechanical Systems, IEEE Service Center, Piscataway, NJ, US, vol. 6, No. 2, Jun. 1, 1997, XP011034742, ISSN: 1057-7157, p. 121-123; figure 8.

*Primary Examiner* — John H Le
(74) *Attorney, Agent, or Firm* — The Ollila Law Group LLC (57) ABSTRACT

A flow device is provided. The flow device includes at least one conduit (20) and a pick-off (30) providing a pick-off signal (35) for measuring motion of the at least one conduit (20). The flow device also includes a drive (40) that receives a first signal (55) for vibrating the at least one conduit (20) at a resonance frequency and that receives a second signal (56) for vibrating the at least one conduit at a frequency that is different than the resonance frequency. One or more electronics (50) is provided. The one or more electronics (50) generates the first and second signals (55, 56), receives the pick-off signal (35) from the pick-off (30), and measures changes in a time shift between the second signal (56) frequency applied by the drive (40) and the second signal (56) frequency detected by the pick-off (30).

10 Claims, 4 Drawing Sheets

FOREIGN PATENT DOCUMENTS

| | | |
|---|---|---|
| JP | 62134031 U | 8/1987 |
| JP | 08035872 A | 2/1996 |
| JP | 9502267 A | 3/1997 |
| JP | 2003185554 A | 7/2003 |
| JP | 2004061124 A | 2/2004 |
| KR | 1020020047235 | 6/2002 |
| RU | 2277226 C2 | 5/2006 |
| WO | 8900678 A1 | 1/1989 |
| WO | 9303336 A1 | 2/1993 |
| WO | 0022385 A | 4/2000 |
| WO | 0129519 A1 | 4/2001 |

* cited by examiner

FLOW DEVICE AND METHOD FOR OPERATING A FLOW DEVICE

FIELD OF THE INVENTION

The present invention relates to vibrating flow devices that are able to determine one or more flowing characteristics of a substance within a vibrating conduit.

BACKGROUND OF THE INVENTION

Vibrating flow devices, such as, for example, densitometers or Coriolis flow meters, are available in various sizes and flow capacities. Densitometers typically have one or more conduits of straight, U-shaped, or an irregular configuration which are vibrated transversely by a drive at a resonance frequency for purposes of determining the density of a substance within the densitometer. The particular resonance frequency at which the one or more conduits vibrates is partially determined by the density of the substance within the one or more vibrating conduits. Accordingly, as the density of the substance within the one or more vibrating conduits changes, the frequency at which resonance occurs will change. Therefore, using well known time-tested principals, the particular frequency at which resonance occurs may be used to compute the density of the substance within the one or more conduits.

Densitometers include one or more electronics that transmit a sinusoidal drive signal to a drive, which is typically a magnet/coil combination with the magnet typically being affixed to the flow tube and the coil being affixed to a supporting structure or to another flow tube. The drive signal causes the drive to vibrate the one or more conduits at the resonance frequency. For example, the drive signal may be a periodic electrical current transmitted to the coil. A pick-off detects the frequency of vibration of the one or more conduits and generates a sinusoidal pick-off signal representative of the motion of the flow tube, including the frequency of vibration of the flow tube. The sinusoidal pick-off signal is transmitted to the one or more electronics and used by the one or more electronics to determine the frequency at which the one or more conduits vibrate. If the one or more conduits are vibrating at the resonance frequency, the electronics may use the pick-off signal to determine the density of the substance within the tube. If the one or more conduits are vibrating at a non-resonance frequency, the electronics may adjust the drive signal transmitted to the drive so that the one or more conduits vibrate at the resonance frequency.

Accordingly, using well known principals, vibrating densitometers have been used for years to measure the density of substances. Vibrating densitometers constructed with a single drive and a single pick-off, however, have in the past been incapable of detecting one or more flowing characteristics of the substance within the conduit, such as, for example, whether the substance within the one or more conduits is flowing, the direction in which the substance is flowing, or the mass flow rate of the substance. In particular, in certain applications it may be desirable to determine whether the substance is flowing. In order to detect the presence of flow, changes in the time shift between the frequency of vibration induced by the driver and the frequency of vibration detected by the pick-off may be used. Those skilled in the art appreciate that the time shift equals the phase difference between the frequency of vibration induced by the driver and the frequency of vibration detected by the pick-off divided by the frequency of vibration induced by the driver and the frequency of vibration detected by the pick-off.

Heretofore, in single drive and single pick-off densitometer systems, however, the frequency detected by the pick-off is phase-locked to the frequency applied by the drive. Therefore, as flow occurs or changes, the time shift between the frequency of vibration applied by the drive and frequency of vibration detected by the pick-off does not change as flow occurs or changes. Accordingly, in the past, at least two pick-offs have been required for the detection of the presence of flow, detection of the direction of flow, and the determination of the mass flow rate of the substance.

The present invention is directed to overcoming this and other disadvantages inherent in prior art densitometers.

SUMMARY OF THE INVENTION

The scope of the present invention is defined solely by the appended claims, and is not affected to any degree by the statements within this summary.

In one embodiment of the present invention, a flow device includes at least one conduit, a pick-off, a drive, and one or more electronics. The pick-off provides a pick-off signal for measuring motion of the at least one conduit. The drive receives a first signal for vibrating the at least one conduit at a resonance frequency and receives a second signal for vibrating the at least one conduit at a frequency that is different than the resonance frequency. The one or more electronics generate the first and second signals, receive the pick-off signal from the pick-off, and measure changes in the time shift between the second signal frequency applied by the drive and the second signal frequency detected by the pick-off.

In another embodiment of the present invention, a flow device includes at least one conduit, a pick-off, a drive, and one or more electronics. The pick-off provides a first pick-off signal for measuring motion of the at least one conduit. The drive alternates between receiving a drive signal to vibrate the at least one conduit at a resonance frequency and providing a second pick-off signal for measuring motion of the at least one conduit. The one or more electronics receive the first and second pick-off signals from the pick-off and the drive and generate the drive signal.

In yet another embodiment of the present invention, a flow device includes at least one conduit, a pick-off, a drive, and one or more electronics. The pick-off provides a pick-off signal for measuring motion of the at least one conduit. The drive receives a drive signal to vibrate the at least one conduit at a resonance frequency. The one or more electronics generate the drive signal, determine a mode of vibration of the at least one conduit, and compare the determined mode of vibration to one or more reference modes of vibration to determine whether a substance is flowing in the at least one conduit.

In still another embodiment of the present invention, a method for operating a flow device includes the steps of using a drive that receives a first signal for vibrating at least one conduit at a resonance frequency and that receives a second signal for vibrating the at least one conduit at a frequency that is different than the resonance frequency at least one conduit, using a pick-off that provides a pick-off signal for measuring motion of the at least one conduit, and using one or more electronics to generate the first and second signals, receive the pick-off signal from the pick-off, and measure changes in the time shift between the second signal frequency applied by the drive and the second signal frequency detected by the pick-off.

In yet a further embodiment of the present invention, a method for operating a flow device includes the steps of using a drive that alternates between receiving a drive signal to vibrate at least one conduit at a resonance frequency and providing a second pick-off signal for measuring motion of the at least one conduit, using a pick-off that provides a first pick-off signal for measuring motion of the at least one conduit, and using one or more electronics that receive the first and second pick-off signals from the pick-off and the drive and generate the drive signal.

In still a further embodiment of the present invention, a method for operating a flow device includes the steps of using a drive that receives a drive signal to vibrate at least one conduit at a resonance frequency, using a pick-off that provides a pick-off signal for measuring motions of the at least one conduit, and using one or more electronics that generate the drive signal, determine a mode of vibration of the at least one conduit, and compare the determined mode of vibration to one or more reference modes of vibration to determine whether a substance is flowing in the at least one conduit.

Aspects

According to one aspect of the present invention, a flow device comprises:
 at least one conduit;
 a pick-off providing a pick-off signal for measuring motion of the at least one conduit;
 a drive that receives a first signal for vibrating the at least one conduit at a resonance frequency and that receives a second signal for vibrating the at least one conduit at a frequency that is different than the resonance frequency; and
 one or more electronics that generate the first and second signals, receive the pick-off signal from the pick-off, and measure changes in the time shift between the second signal frequency applied by the drive and the second signal frequency detected by the pick-off.

Preferably, the one or more electronics measures changes in the time shift to determine whether a substance is flowing within the at least one conduit.

Preferably, the one or more electronics measures changes in the time shift to determine a direction at which a substance is flowing within the at least one conduit.

Preferably, the one or more electronics measures changes in the time shift to determine the mass flow rate of a substance flowing within the at least one conduit.

Preferably, the flow device further comprises another pick-off wherein the one or more electronics measures changes in the time shift to determine whether the pick-off and the another pick-off are functioning properly.

According to another aspect of the present invention, a flow device comprises:
 at least one conduit;
 a pick-off providing a first pick-off signal for measuring motion of the at least one conduit;
 a drive (140) that alternates between receiving a drive signal (155) to vibrate the at least one conduit (120) at a resonance frequency and providing a second pick-off signal (145) for measuring motion of the at least one conduit; and
 one or more electronics that receive the first and second pick-off signals from the pick-off and the drive and generate the drive signal.

Preferably, when the one or more electronics measures changes in the time shift to determine whether a substance is flowing within the at least one conduit.

Preferably, when the one or more electronics measures changes in the time shift to determine a direction at which a substance is flowing within the at least one conduit.

Preferably, when the one or more electronics measures changes in the time shift to determine the mass flow rate of a substance flowing within the at least one conduit.

Preferably, the flow device further comprises another pick-off wherein the one or more electronics measures changes in the time shift to determine whether the pick-off and the another pick-off are functioning properly.

Preferably the flow device further comprises a switch, wherein:
 when the switch is in a first configuration the drive receives the drive signal and vibrates the at least one conduit at the resonance frequency; and
 when the switch is in a second configuration the one or more electronics receive the second pick-off signal from the drive pick-off.

Preferably, when the switch is in the first position, the second pick-off signal is not received by the one or more electronics.

Preferably, when the switch is in the second position, the drive signal is not received by the drive.

According to another aspect of the present invention, a flow device comprises:
 at least one conduit;
 a pick-off providing a pick-off signal for measuring motions of the at least one conduit;
 a drive that receives a drive signal to vibrate the at least one conduit at a resonance frequency; and
 one or more electronics that generate the drive signal, determine a mode of vibration of the at least one conduit, and compare the determined mode of vibration to one or more reference modes of vibration to determine whether a substance is flowing in the at least one conduit.

Preferably, the one or more electronics measures changes in the time shift to determine whether a substance is flowing within the at least one conduit.

According to another aspect of the present invention, a method for operating a flow device comprises the steps of:
 using a drive that receives a first signal for vibrating at least one conduit at a resonance frequency and that receives a second signal for vibrating the at least one conduit at a frequency that is different than the resonance frequency at least one conduit;
 using a pick-off that provides a pick-off signal for measuring motion of the at least one conduit; and
 using one or more electronics to generate the first and second signals, receive the pick-off signal from the pick-off, and measure changes in the time shift between the second signal frequency applied by the drive and the second signal frequency detected by the pick-off.

Preferably, the one or more electronics measures changes in the time shift to determine whether a substance is flowing within the at least one conduit.

Preferably, the one or more electronics measures changes in the time shift to determine a direction at which a substance is flowing within the at least one conduit.

Preferably, the one or more electronics measures changes in the time shift to determine the mass flow rate of a substance flowing within the at least one conduit.

Preferably, the method for operating a flow device, further comprises the step of using another pick-off, wherein the one or more electronics measures changes in the time shift to determine whether the pick-off and the another pick-off are functioning properly.

According to another aspect of the present invention, a method for operating a flow device comprises the steps of:
 using a drive that alternates between receiving a drive signal to vibrate at least one conduit at a resonance frequency and providing a second pick-off signal for measuring motion of the at least one conduit;
 using a pick-off that provides a first pick-off signal for measuring motion of the at least one conduit; and using one or more electronics that receive the first and second pick-off signals from the pick-off and the drive and generate the drive signal.

Preferably, the one or more electronics measures changes in the time shift to determine whether a substance is flowing within the at least one conduit.

Preferably, the one or more electronics measures changes in the time shift to determine a direction at which a substance is flowing within the at least one conduit.

Preferably, the one or more electronics measures changes in the time shift to determine the mass flow rate of a substance flowing within the at least one conduit.

Preferably, the method for operating a flow device further comprises the step of using another pick-off wherein the one or more electronics measures changes in the time shift to determine whether the pick-off and the another pick-off are functioning properly.

Preferably, the method for operating a flow device further comprises the step of using a switch, wherein:

when the switch is in a first configuration the drive receives the drive signal and vibrates the at least one conduit at the resonance frequency; and when the switch is in a second configuration the one or more electronics receive the second pick-off signal from the drive pick-off.

Preferably, when the switch is in the first position, the second pick-off signal is not received by the one or more electronics.

Preferably, when the switch is in the second position, the drive signal is not received by the drive.

According to another aspect of the present invention, a method for operating a flow device comprises the steps of:

using a drive that receives a drive signal to vibrate at least one conduit at a resonance frequency;

using a pick-off that provides a pick-off signal for measuring motions of the at least one conduit; and using one or more electronics that generate the drive signal, determine a mode of vibration of the at least one conduit, and compare the determined mode of vibration to one or more reference modes of vibration to determine whether a substance is flowing in the at least one conduit.

Preferably, the one or more electronics measures changes in the time shift to determine whether a substance is flowing within the at least one conduit.

DETAILED DESCRIPTION OF THE INVENTION

Figure 1:
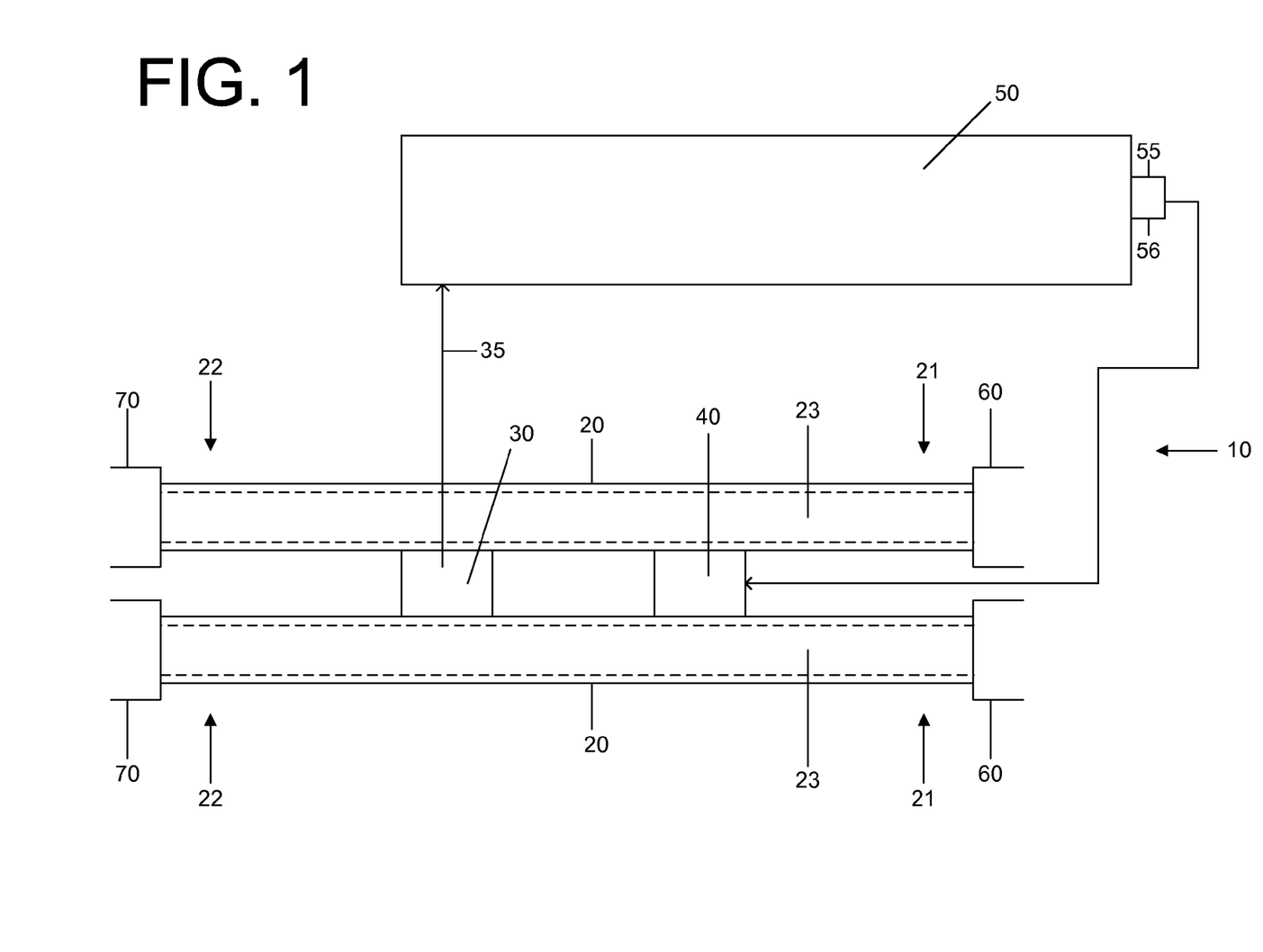
FIG. 1 depicts a densitometer according to an embodiment of the present invention.

FIG. 1 depicts a densitometer 10 according to an embodiment of the present invention. As shown therein, the densitometer 10 is provided with conduits 20, a pick-off 30, a drive 40, and one or more electronics 50. Ends 21, 22 of the conduits 20 are connected to inlets 60 and outlets 70, respectively.

In the present embodiment, the conduits 20 are provided with generally straight shapes, however, the conduits 20 may be provided with other shapes, such as U-shapes or irregular shapes. The conduits 20 define cavities 23 for receiving a substance. The substance may comprise a liquid, a gel, a slurry, a gas, and/or a solid. The substance is normally introduced to the conduits 20 via the inlets 60, flows through the cavities 23, and exits the conduits via the outlets 70. Alternatively, in certain situations, the flow direction of the substance may be reversed so that it is introduced into the conduits 20 via the outlets 70, flows through the cavities 23, and exits the conduits via the inlets 60.

The densitometer 10 measures the density of a substance as it flows through the cavity 23 of the conduits 20. As the substance is within the cavity 23, the one or more electronics 50 sends a drive signal 55 to the drive 40, which vibrates the conduits 20 at a resonance frequency. As this occurs, the particular frequency at which resonance occurs varies according to the density of the substance flowing within the cavity. The pick-off 30 detects the frequency of vibration and transmits a pick-off signal 35 to the one or more electronics 50. The one or more electronics 50 uses this information to provide the appropriate drive signal 55 to the drive 40 so that the conduits 20 vibrate at a resonance frequency and also to measure the density of the substance flowing in the conduits 20. The density of the substance within the conduits 20 may be determined according to the following equation:

$$D = K_0 + K_1 \times \tau + K_2 \times \tau^2$$

Where

D is the density (kg/m$^3$)

K0, K1 and K2 are instrument calibration factors, and $\tau$ is instrument time period (µs).

While vibrating densitometers have been used satisfactorily for years to measure the density of substances, heretofore, vibrating densitometers with a single drive and a single pick-off have been unable to detect the presence of flow. Accordingly, in the embodiment depicted in FIG. 1, the one or more electronics 50 are configured to apply two different signals 55, 56 to the drive 40. A first signal 55 corresponds to a drive signal and is used by the drive 40 to vibrate the conduits 20 at a resonance frequency. A second signal 56 is also transmitted to the drive 40. The second signal 56 causes the drive 40 to vibrate the conduits 20 at a different frequency than the resonance frequency. The frequencies of the first and second signals 55, 56 may be added together and applied by the drive 40 to the conduits 20.

The time shift between the frequency of the first signal 55 applied by the drive 40 and the frequency of the first signal 55 detected by the pick-off 30 is still locked, however, the time shift between the frequency of the second signal 56 applied by the drive 40 and the frequency of the second signal 56 detected by the pick-off 30 varies according to the flow rate of the substance within the conduits 20. In this manner, it is possible to detect the presence of flow, the direction of flow, and the mass flow rate of the substance.

In one example, the substance within the conduits 20 is water and the first signal 55 causes the drive 40 to vibrate the conduits 20 at a resonant frequency. A second signal 56 that causes the conduits 20 to vibrate at a frequency that is different than the resonant frequency was added to the first signal 55. The time shift between the frequency of the second signal 56 applied by the drive 40 and the frequency of the second signal 56 detected by the pick-off 30 is shown as a function of flow on the chart depicted in FIG. 2.

Figure 2:
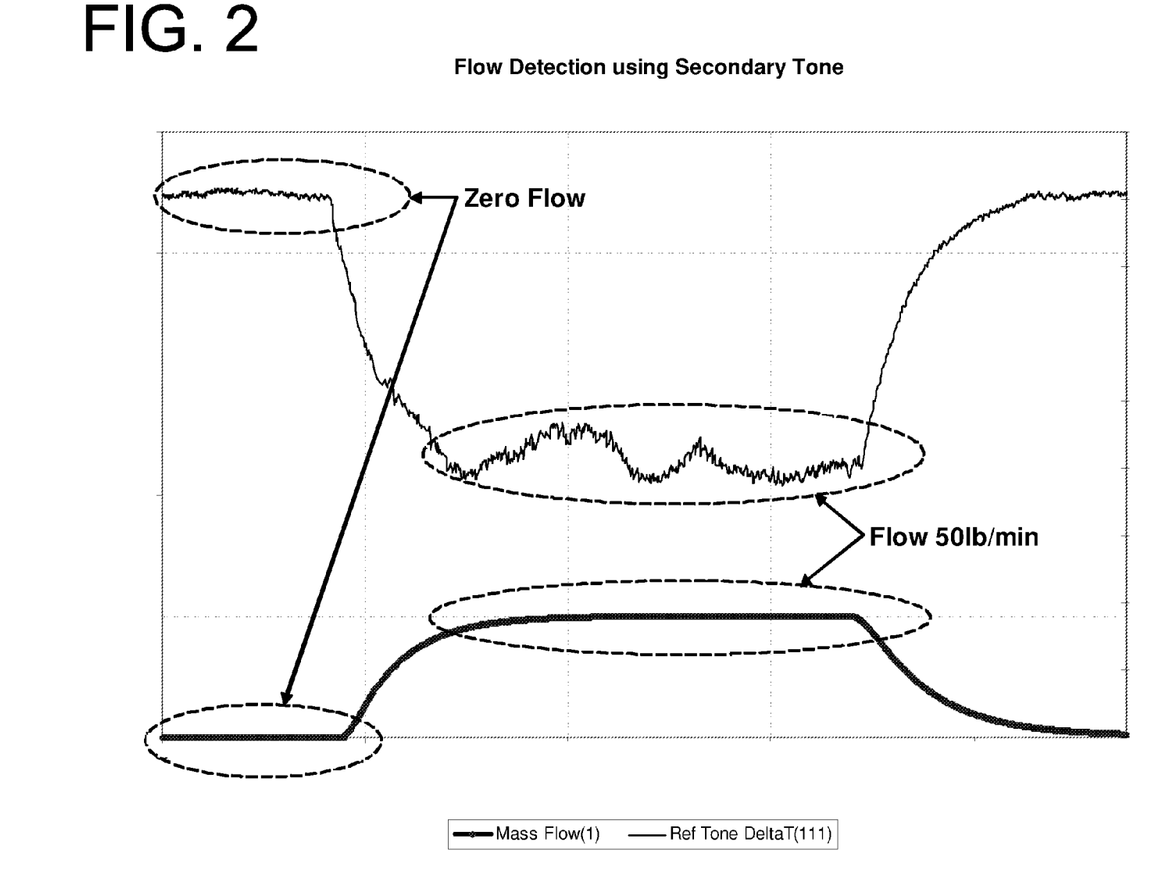
FIG. 2 depicts a chart showing the time shift between a second frequency applied by a drive and detected by a pick-off as a function of flow.

In FIG. 2, the lower curve is the actual mass flow rate of the water through the cavity 23 of the conduits 20. The upper curve shown in FIG. 2 is the detected flow rate produced as a function of the time shift of the frequency induced transmission of the second signal 56 to the drive 40. Accordingly, through transmission of a second signal 56 it is possible to determine the presence of flow and the mass flow rate as a function of the changes in the time shift. In FIG. 2, had the flow of the water been in a reverse direction, the upper curve would be inverted. Accordingly, in addition to detecting the presence of flow and the mass flow rate, it is also possible to detect flow direction using the device shown in FIG. 1.

Figure 3:
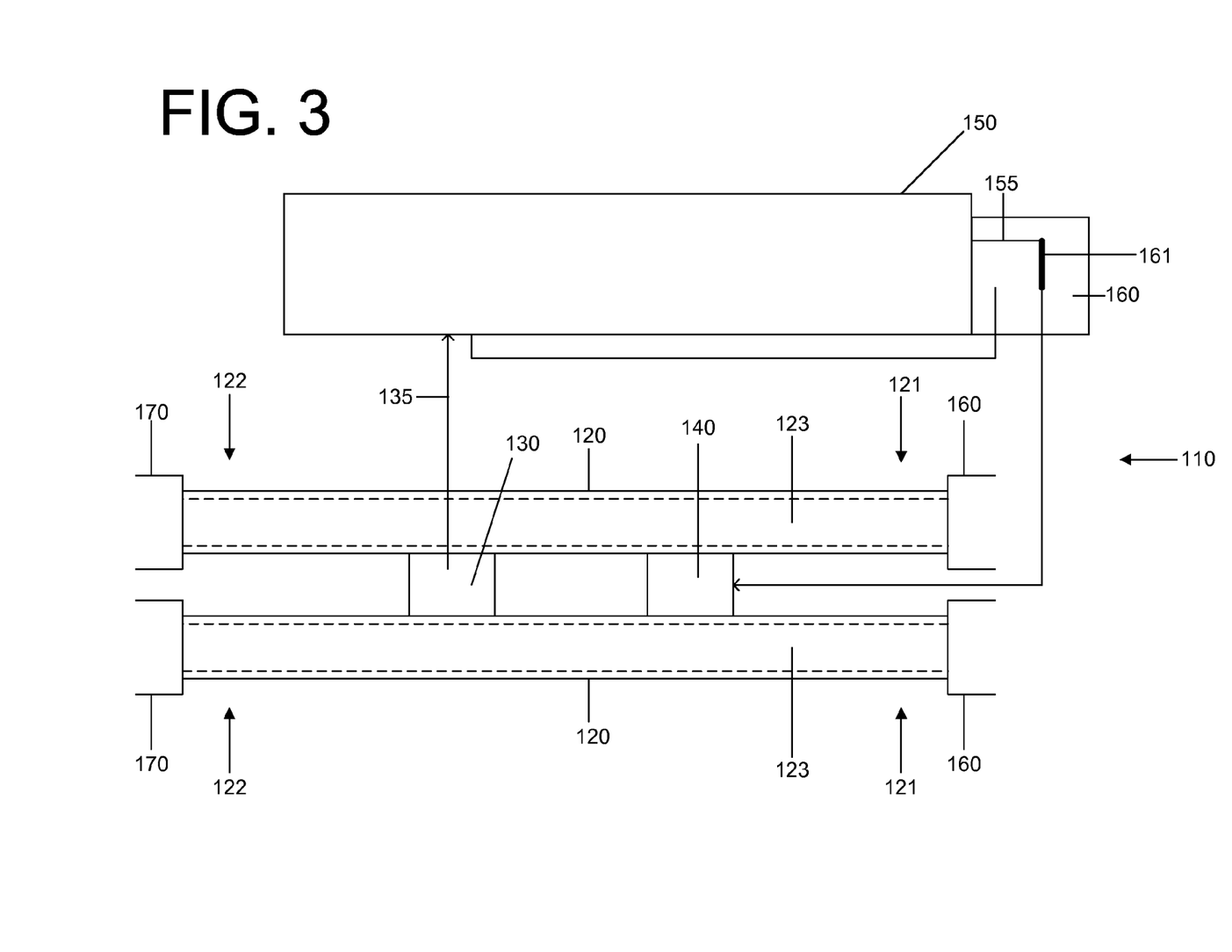
FIG. 3 depicts a densitometer according to an embodiment of the present invention showing a switch in a first configuration.
Figure 4:
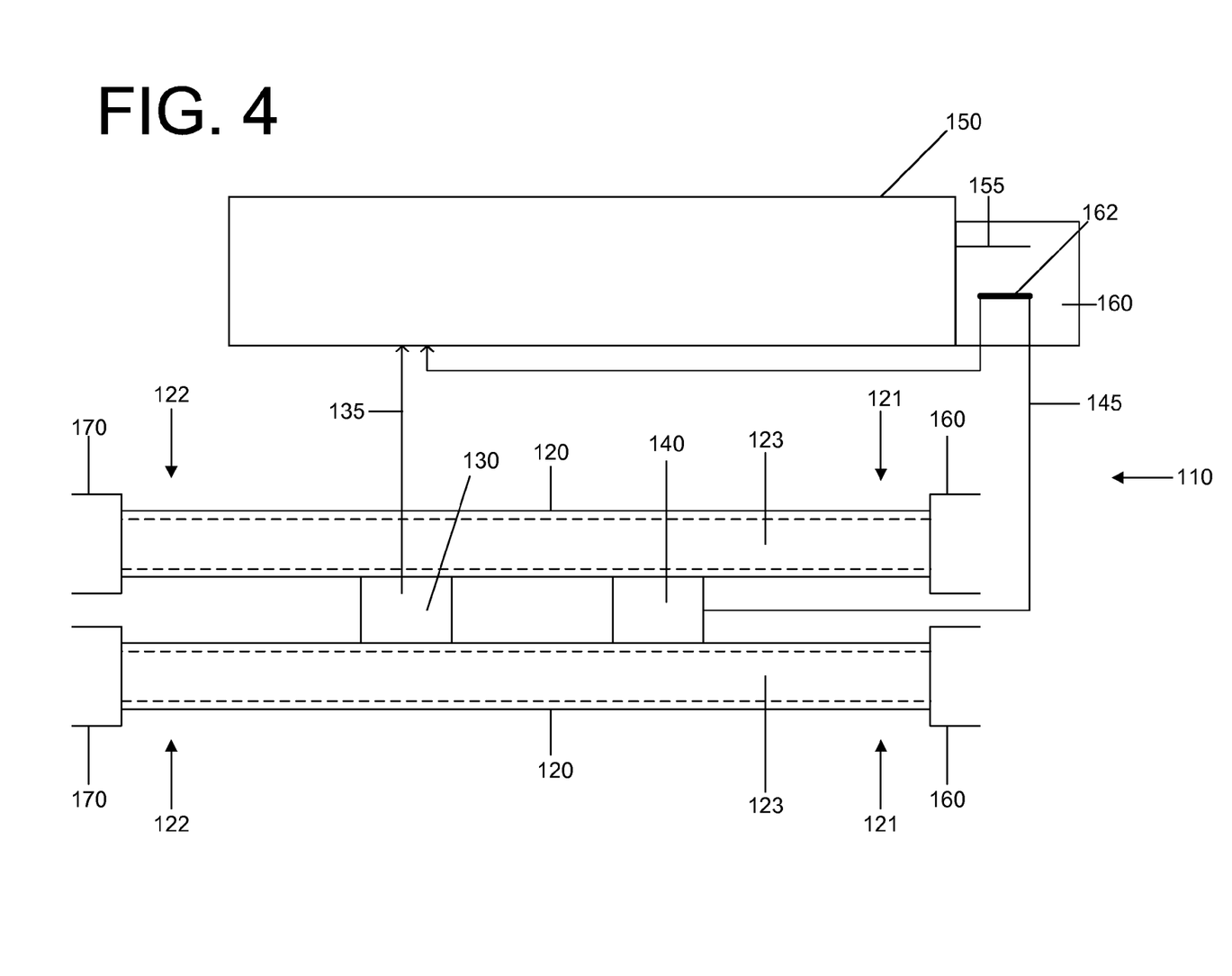
FIG. 4 depicts a densitometer according to an embodiment of the present invention showing a switch in a second configuration.

FIGS. 3 and 4 depict another embodiment of the present invention that allows for the detection of the presence of flow, the direction of flow, and the mass flow rate of a substance. As shown therein, a densitometer 110 is provided with conduits 120, a pick-off 130, a drive 140, one or more electronics 150 and a switch 160. Ends 121, 122 of the conduits 20 are connected to an inlet 160 and an outlet 170, respectively.

In the embodiment of FIGS. 3 and 4, the drive 140 functions as a drive pick-off. According to one aspect of the present embodiment, the drive 140 vibrates the conduits 120 at a resonance frequency. According to another aspect of the present embodiment the drive 140 detects the frequency at which the conduits 120 vibrate. Advantageously, once the conduits 120 are vibrating at a resonance frequency, they will continue vibrating at this frequency for some time even in the absence of the transmission of the drive signal 155 to the drive 140. Accordingly, in the present embodiment, the drive 140 may alternate between functioning as a drive and functioning as a pick-off.

As shown in FIGS. 3 and 4, the densitometer 110 includes a switch 160. When the switch 160 is in a first configuration 161, shown in FIG. 3, the drive signal 155 is transmitted from the one or more electronics 150 to the drive 140. When the switch is in a second configuration 162, shown in FIG. 4, a pick-off signal 145 is transmitted from the drive 140 to the one or more electronics 150. Accordingly, as the conduits 120 are vibrating at a resonance frequency, the one or more electronics 150 may receive a first pick-off signal 135 from pick-off 130 and a second pick-off signal 145 from drive 140. The one or more electronics 150 can then measure the time shift between the frequency of the first pick-off signal 135 and the second pick-off signal 145 to determine the presence of flow and the mass flow rate.

Although the embodiments shown in FIGS. 3 and 4 depict a switch 160, which is configured so that the drive 140 alternates between receiving a drive signal 155 to vibrate the at least one conduit 120 at a resonance frequency and providing a second pick-off signal 145 for measuring motion of the at least one conduit, it is within the scope of the present invention to use alternative arrangements. By way of example, and not limitation, in alternative embodiments the one or more electronics 150 may be configured or programmed to apply the drive signal 155 at intermittent intervals such that the drive 140 may provide a second pick-off signal 145 when the drive signal 155 is not applied thereto.

The densitometer assemblies 10 and 110 in FIGS. 1, 3, and 4 as well as other densitometers may also be used to determine mass flow through determination of the mode of vibration that occurs when the conduits 20 or 120 are vibrating at a resonance frequency. The modes of vibration may be of a simple bending, twisting, torsional, or coupled type. For example, the twist mode of vibration will occur when the conduits 20 or 120 vibrate at a resonance frequency and when a substance is flowing in the conduits 20 or 120. Accordingly, it is possible to determine the presence of flow based on the mode of vibration of the conduits 20 or 120. For example, the pick-off 30 shown in FIG. 1 may provide a pick-off signal 35 and allow the mode of vibration of the conduits 20 to be determined by the one or more electronics 50. Likewise, the pick-off 130 and/or drive 140 shown in FIGS. 3 and 4 may provide the first pick-off signal 35 and/or the second pick-off signal 45 and allow the mode of vibration of the conduits 120 to be determined by the one or more electronics 150. The determined modes of vibrations may then be compared with one or more reference modes of vibration determined under known flow and/or non-flowing conditions. Since the modes of vibration are differentiable between flowing and non-flowing conditions, the presence of flow may be detected in this manner.

The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. By way of example, and not limitation, those of ordinary skill in the art will appreciate that it is within the scope of the present invention for the densitometer assemblies 10 and 110 to be provided with a single conduit 20 or 120. Furthermore, by way of example, and not limitation, those of ordinary skill in the art will appreciate that it is within the scope of the present invention for the densitometer assemblies 10 and 110 to be provided with more than one pick-off 30 or 130 and more than one drive 40 or 140. For example, the principals of the present invention can be used in other flow devices, such as a Coriolis flow meter, including the Coriolis flow meter 5 described in U.S. Pat. No. 6,782,325, the disclosure of which is hereby incorporated herein by reference, having at least two pick-offs and at least one drive for purposes of determining whether the two pick-offs are functioning appropriately. For example, the information generated from the two pick-offs can be compared with the information generated according to principals of the present invention for purposes of determining whether one or both of the pick-offs are functioning properly. Furthermore, those of ordinary skill in the art will appreciate that the pick-off and/or drive can measure motions of the at least one conduit other than the frequency of vibration of the at least one conduit. For example, the pick-off and/or drive can be used to determine a mode of vibration or relative motion between different points along the conduits 20. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein may be applied to other embodiments than those described above and shown in the accompanying figures. Accordingly, the scope of the invention is determined from the following claims.

We claim:

1. A flow device, comprising:
 at least one conduit (20);
 a pick-off (30) providing a pick-off signal (35) for measuring motion of the at least one conduit (20);

a drive (40) that receives a first signal (55) for vibrating the at least one conduit (20) at a resonance frequency and that receives a second signal (56) for vibrating the at least one conduit at a frequency that is different than the resonance frequency; and one or more electronics (50) that generate the first and second signals (55, 56), receive the pick-off signal (35) from the pick-off (30), and measure changes in a time shift between the second signal (56) frequency applied by the drive (40) and the second signal (56) frequency detected by the pick-off (30).

2. The flow device according to claim 1, wherein the one or more electronics (50) measures changes in the time shift to determine whether a substance is flowing within the at least one conduit.

3. The flow device according to claim 1, wherein the one or more electronics (50) measures changes in the time shift to determine a direction at which a substance is flowing within the at least one conduit.

4. The flow device according to claim 1, wherein the one or more electronics (50) measures changes in the time shift to determine the mass flow rate of a substance flowing within the at least one conduit.

5. The flow device according to claim 1, further comprising another pick-off (30) wherein the one or more electronics measures changes in the time shift to determine whether the pick-off (30) and the another pick-off (30) are functioning properly.

6. A method for operating a flow device, comprising steps of:

using a drive (40) that receives a first signal (55) for vibrating at least one conduit (20) at a resonance frequency and that receives a second signal (56) for vibrating the at least one conduit at a frequency that is different than the resonance frequency at least one conduit (20);

using a pick-off (30) that provides a pick-off signal (35) for measuring motion of the at least one conduit (20); and using one or more electronics (50) to generate the first and second signals (55, 56), receive the pick-off signal (35) from the pick-off (30), and measure changes in a time shift between the second signal (56) frequency applied by the drive (40) and the second signal (56) frequency detected by the pick-off (30).

7. The method for operating the flow device according to claim 6, wherein the one or more electronics (50) measures changes in the time shift to determine whether a substance is flowing within the at least one conduit.

8. The method for operating the flow device according to claim 6, wherein the one or more electronics (50) measures changes in the time shift to determine a direction at which a substance is flowing within the at least one conduit.

9. Currently Amended) The method for operating the flow device according to claim 6, wherein the one or more electronics (50) measures changes in the time shift to determine the mass flow rate of a substance flowing within the at least one conduit.

10. The method for operating the a flow device according to claim 6, further comprising a step of using another pick-off (30), wherein the one or more electronics measures changes in the time shift to determine whether the pick-off (30) and the another pick-off (30) are functioning properly.

* * * * *

UNITED STATES PATENT AND TRADEMARK OFFICE
CERTIFICATE OF CORRECTION

PATENT NO. : 8,364,426 B2
APPLICATION NO. : 12/680631
DATED : January 29, 2013
INVENTOR(S) : Craig B McAnally et al.

Page 1 of 1

It is certified that error appears in the above-identified patent and that said Letters Patent is hereby corrected as shown below:

In the Claims

Column 10, Line 20, delete "Currently Amended)"

Signed and Sealed this
Fifteenth Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,364,426 B2  Page 1 of 1
APPLICATION NO. : 12/680631
DATED : January 29, 2013
INVENTOR(S) : McAnally et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 401 days.

Signed and Sealed this
First Day of September, 2015

Michelle K. Lee
*Director of the United States Patent and Trademark Office*